United States Patent
Metsch et al.

(10) Patent No.: US 11,609,784 B2
(45) Date of Patent: Mar. 21, 2023

(54) METHOD FOR DISTRIBUTING A COMPUTATIONAL PROCESS, WORKLOAD DISTRIBUTION DEVICE AND SYSTEM FOR DISTRIBUTING A COMPUTATIONAL PROCESS

(71) Applicant: Intel Corporation, Santa Clara, CA (US)

(72) Inventors: Thijs Metsch, Bruehl (DE); Leonard Feehan, Leixlip (IE); Annie Ibrahim Rana, Dublin (IE); Rahul Khanna, Portland, OR (US); Sharon Ruane, Leixlip (IE); Marcin Spoczynski, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 15/955,731

(22) Filed: Apr. 18, 2018

(65) Prior Publication Data
US 2019/0324799 A1     Oct. 24, 2019

(51) Int. Cl.
*G06F 9/48* (2006.01)
*G06F 9/50* (2006.01)
*G06N 20/00* (2019.01)

(52) U.S. Cl.
CPC ......... *G06F 9/4881* (2013.01); *G06F 9/5083* (2013.01); *G06N 20/00* (2019.01)

(58) Field of Classification Search
CPC ...... G06F 9/4881; G06F 9/5083; G06N 20/00
See application file for complete search history.

(56) References Cited

U.S. PATENT DOCUMENTS

| | | | | |
|---|---|---|---|---|
| 8,401,863 | B1* | 3/2013 | Melkote | H03M 7/24 375/240 |
| 9,921,866 | B2 | 3/2018 | Ganguli et al. | |
| 2002/0194251 | A1* | 12/2002 | Richter | G06F 9/5011 718/104 |
| 2003/0123424 | A1* | 7/2003 | Jung | H04W 48/18 370/395.21 |
| 2008/0263551 | A1* | 10/2008 | Ali | G06F 11/1461 718/102 |
| 2013/0054809 | A1* | 2/2013 | Urmanov | G06F 9/5083 709/226 |
| 2016/0182320 | A1 | 6/2016 | Bartfai-Walcott et al. | |
| 2017/0206107 | A1* | 7/2017 | Guha | G06F 3/0647 |
| 2019/0208009 | A1* | 7/2019 | Prabhakaran | H04L 67/16 |
| 2019/0324799 | A1* | 10/2019 | Metsch | G06F 9/4881 |

OTHER PUBLICATIONS

Fuller, Robert; HTML in simple steps or less; 1961-c2004.*

(Continued)

*Primary Examiner* — Camquy Truong
(74) *Attorney, Agent, or Firm* — Compass IP Law PC (57) ABSTRACT

A method for distributing at least one computational process amongst shared resources is proposed. At least two shared resources capable of performing the computational process are determined. According to the method, a workload characteristic for each of the shared resources is predicted. The workload characteristic accounts for at least two subsystems of each shared resource. One of the at least two shared resources is selected based on the predicted workload characteristics.

21 Claims, 5 Drawing Sheets

(56) References Cited

OTHER PUBLICATIONS

Cortez, Eli, et al., "Resource Central: Understanding and Predicting Workloads for Improved Resource Management in Large Cloud Platforms?", © 2017 Association for Computing Machinery, Oct. 28, 2017, 15 pages.

Ferdman et al., "Clearing the clouds: a study of emerging scale-out workloads on modem hardware," In Proceedings of the 17th Conference on Architectural Support for Programming Languages and Operating Systems (ASPLOS 2012).

\* cited by examiner

METHOD FOR DISTRIBUTING A COMPUTATIONAL PROCESS, WORKLOAD DISTRIBUTION DEVICE AND SYSTEM FOR DISTRIBUTING A COMPUTATIONAL PROCESS

FIELD

Examples relate to methods for distributing at least one computational process amongst shared resources. Further examples relate to workload distribution devices, systems for distributing a computational process and an apparatus for distributing at least one computational process amongst shared resources.

BACKGROUND

Computing services can provide access to computing resources shared by a plurality of users. For example, cloud computing providers offer access to shared pools of system resources or computational devices as servers of a server farm. A user can request from the computing service to solve a computational task. For example, a resource or time intensive computational tasks can be transferred to the computing service due to hardware limitations of a device owned by the user, e.g. limited computational power or storage.

Requested computational tasks are distributed amongst the system resources of the computing service e.g. by the service provider. A computing system may comprise a number of resources able to process the requested task. For distributing requested computational tasks, other service providers, resource managers or orchestration solutions may evaluate which of the number of available shared resources is best suited to perform the computational task on for example the least loaded shared resource. To provide sufficient computing capacity for all potential user requests it may be necessary that service providers have to provide an overhead or an increased number of shared system resources to ensure service delivery to all users. An overhead of shared resources may lead to increased costs. There may be a need for improved concepts for distribution of computational tasks amongst shared resources.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Systems with shared resources have a limited number of resources computational processes or tasks can be distributed to. Therefore, e.g. for improving efficiency of utilization of the available resources, predicting an impact of the computational process on the resource can be necessary to optimally distribute the computational tasks. Other concepts may be unable to capture a behavior of a system or of shared resources of the system when performing a computational process, e.g. on one of the shared resources. Therefore, in the following, methods are proposed to e.g. capture behavioral patterns of workloads and resources in systems like e.g. data centers by fingerprinting. Fingerprinting may relate to a computing pattern of a computational process or to an impact of the computational process on a shared resource. Other concepts may lack sufficient control mechanisms, e.g. for controlling distribution of computational processes. Examples of proposed methods relate to controlling provisioning or placement of workload, e.g. computational processes based on model driven control to enable a more efficient utilization of the shared resources.

Figure 1:
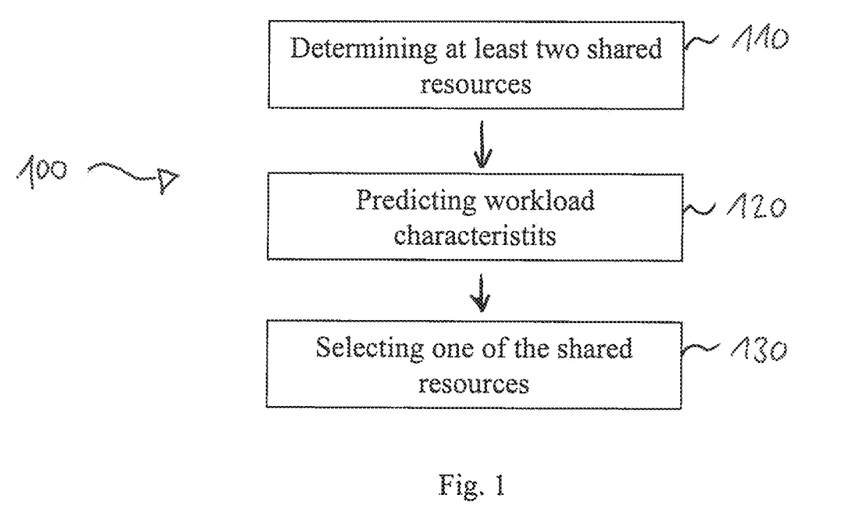
FIG. 1 shows a flow chart of an example of a method for distributing a computational process.

FIG. 1 shows an example of a method 100 for distributing a computational process. The method 100 for distributing at least one computational process amongst shared resources comprises determining 110 at least two shared resources capable of performing the computational process. The method 100 further comprises predicting 120 a workload characteristic for each of the shared resources. The predicted workload characteristic accounts for at least two subsystems of each shared resource. The method 100 comprises selecting 130 one of the at least two shared resources based on the predicted workload characteristics.

The at least one computational process can be a resource intensive task with specific resource requirements. For example, a system may comprise a number of shared resources. The system may be a computing cluster, computing grid, and/or a cloud service, or a compute node within a computing cluster, computing grid, and/or a cloud service. The system may comprise at least two shared resources meeting the requirements of the computational process or being able to perform the computational process. Accordingly, at least two shared resources capable of performing the computational process are determined 110. In some examples, the system may comprise more than two resources capable of performing the computational process and for example a third and/or further shared resources can be determined 110. It is possible to determine 110 a shared resource as being capable of performing the computational process due to its general capacities although, e.g. due to another computational process currently running on the shared resource, it may actually not be capable of performing the computational process at the moment. This is possible because the currently running process may be transferred or migrated to another shared resource of the system before starting performing the computational process. In other words, shared resources can be determined 110 that are generally or without being loaded capable of performing the computational process. A computational process to be distributed may e.g. relate to image processing, artificial intelligence, searching, virus scanning, computational decision making, etc.

According to the method 100, for each of the determined shared resources a workload characteristic is predicted 120. Predicting 120 the workload characteristic may comprise predicting an impact of the computational process on the shared resource or on the load of the shared resource. For example, predicting 120 the workload characteristic comprises predicting at least one of a utilization or degree of utilization, latency, and a throughput of the shared resource, pretending the computational process would be performed on the shared resource. A resulting workload characteristic may be estimated. The shared resource may show a first workload characteristic without the computational process being performed and a second workload characteristic with their computational process being performed on the shared resource. The first workload characteristic may show the impact of another computational process already running on the shared resource. The second workload characteristic can be predicted 120 without actually performing the computational process on the shared resource. The second workload characteristic may depend on the at least one other computational process running on the shared resource.

The workload characteristic takes at least two subsystems of each shared resource into account. For example, a load of the subsystems in the case of running the computational process can be predicted. The shared resource comprises the at least two subsystems to enable performing the computational process. For example, a first subsystem may be a processor and a second subsystem may be a memory. The workload characteristic may indicate an impact of performing the computational process on the subsystems. For example, the workload characteristic may show a utilization of each subsystem. A first computational process may use the first subsystem completely, resulting in a predicted workload characteristic indicating full utilization of the first subsystem. A second computational process may require 50% of the capacity of the first subsystem and the predicted workload characteristic may indicate half utilization of the first subsystem. For example, the workload characteristics may be used to determine whether a further computational process can be run on the shared resource simultaneously, e.g. to fully load the first subsystem of the shared resource and to use the shared resource efficiently. For example, the utilization may increase nonlinear when performing a plurality of same computational processes on the shared resource. Predicting 120 the workload characteristic may depend on other processes running on the shared resource and/or predicting 120 may take nonlinear behavior of the shared resource into account.

Further, the predicted workload characteristics may be provided and selecting 130 one of the at least two determined shared resources is based on the predicted workload characteristics according to the method 100. In some examples, the predicted workload characteristics of the determined shared resources differ from each other, for example if another computational process is already running on one of the determined shared resources and/or the determined shared resources comprise different subsystems, e.g. hardware components. The differing workload characteristics can be used to select 130 the one shared resource to perform the computational process. For example, the selected shared resource may result in a higher total utilization of its subsystems compared to the total utilization of the subsystems of the at least one other determined shared resource. This may enable efficient usage of the shared resources as a utilization of the capacities of the subsystems may be optimized. Loading shared resources to full utilization or running them at least close to full utilization may enable to provide less shared resources while keeping a number of simultaneously performable computational processes constant.

The method 100 may be used to choose a shared resource for performing a new computational process. Additionally or alternatively, the method 100 may be used for migrating one or more running computational process other shared resources, wherein the other shared resource can continue running the computational process. For example, migrating a running computational process may be necessary if a new computational process has to be performed on a shared resource. The method 100 may be used to redistribute running processes and may enable automatic sorting or rearrangement of computational processes running on the system for enabling efficient utilization of the shared resources.

For example, selecting 130 the shared resource may result in a more uniform load distribution of the shared resource. The more uniform load distribution can relate to a load of the subsystems and may comprise that a degree of utilization of the first subsystem and a degree of utilization of the second subsystem of the selected shared resource differ by less than 30% (or by less than 20% or by less than 10%). The degree of utilization of a subsystem can be determined based on the predicted workload characteristics. The uniform workload distribution may comprise a minimum variance between the at least two resource parameters of the workload characteristic of the subsystem. For example, the degrees of utilization of the subsystems of the chosen shared resource may differ less than the degrees of utilization of the subsystems of another shared resource. Selecting 130 the shared resource resulting in a more balanced utilization of the subsystems of the shared resource may enable providing the shared resource for performing other, additional computational processes, for example if they require equal capacities of the subsystems. Further, more balanced utilization of the subsystems may enable a more efficient utilization of the shared resource as all of the subsystems may be fully utilized and non-utilization of a single subsystem may be avoided. Tighter packaging of workloads on shared resources and accordingly a better resultant total cost of ownership (TCO) may be achieved by using the method 100.

Additionally or alternatively, selecting 130 the shared resource may result in a more uniform load distribution amongst the shared resources. The different shared resources of a system may be differently loaded due to other computational processes running on the shared resources. For example, the workload characteristics of the shared resources may differ by less than 30% (or by less than 20% or by less than 10%) when performing the computational process on the selected shared resource. By selecting 130 the shared resource, a utilization of the shared resources (and/or their respective subsystems) within the system may be more balanced. A more uniform load distribution amongst the shared resources may avoid peaks of utilization or overloading of e.g. one resource. By avoiding peaks it may be possible to provide shared resources comprising subsystems with reduced capacity (e.g. reduced computational power and/or reduced memory capacities) compared to other shared resources, capable of performing the same computational processes as the other shared resources. Using the method 100 may result in reduced costs for a system with the shared resources and/or in reduced costs for the shared resources.

For example, selecting 130 the shared resource may result in a higher probability of a more uniform load distribution. Some computational processes may cause a workload characteristic comprising an uncertainty about utilization of a subsystem, for example. In other words, for some computational processes, it may be possible to predict workload characteristics more reliably than for other computational processes. For example, for distributing a computational process with an unreliable predicted workload characteristic, it may be possible to select 130 a shared resource that does not yet perform another computational process related to an unreliable workload characteristic. It may be avoided to select 130 a computational resource already running a computational process with a related unreliable workload characteristic when a computational process with an unreliable workload characteristic is to be distributed.

Optionally, predicting 120 a workload characteristic may comprise evaluating an expected load of the subsystems over a predetermined duration. A first computational process may constantly load the shared resource while a second computational process may load the shared resource depending on the time, for example periodically. Consequently, the workload characteristic related to the first computational process may indicate a constant expected load over the predetermined duration. The predetermined duration may be the duration needed for completely performing the computational process. The workload characteristic related to the second computational process may for example indicate that in a first part of the predetermined duration, the second computational process causes a first expected load or degree of utilization of the subsystem whereas in another, second part the second computational process causes a second expected load or degree of utilization of the subsystem. For example, some computational processes may cause a varying workload characteristic when being performed on the shared resource.

For example, predicting 120 the workload characteristic may comprise determining a frequency of a variation of a load of the subsystems while performing the computational process. For example, a computational process may load the subsystems periodically with a certain frequency that can be determined. Within a period, the subsystems may be loaded for a certain time that can be determined. In other words, the workload characteristic may comprise a periodic signal with a duty cycle. For example, depending on the frequency and/or the duty cycle, two or more computational processes may be performable simultaneously on a shared resource. A computational process with a workload characteristic comprising a low frequency and a low duty cycle may be distributed to a shared resource already running another computational process with a workload characteristic also comprising a low frequency and a low duty cycle. For example, the two computational processes may load the subsystems of the shared resource alternately.

Optionally, the method 100 may comprise determining a behavioral model for a shared resource by measuring a resulting load of the subsystems of a shared resource while performing at least one computational process on the shared resource. The determined behavioral model may be used for predicting 120 workload characteristics of computational processes. Telemetry or other load measuring techniques may be used for measuring the resulting load of the subsystems. In an example, the computational process may be run on the shared resource and the resulting load of the subsystems may be measured. For example, the behavioral model can be based on performing a plurality of different computational processes on the shared resource. The method 100 may comprise providing the determined behavioral model for predicting the workload characteristic for the respective shared resource.

For example, a combination of computational processes of a plurality of computational processes may be performed on the shared resource for determining the behavioral model. Using a combination of computational processes may enable to determine nonlinear behavioral models, for example if a resulting load of a shared resource depends on other computational processes already running on the shared resource. Determined behavioral models may for example be used for a plurality of shared resources, for example if the shared resources comprise the same types of subsystems.

Determining the behavioral model may comprise determining a temporal variation of the resulting load of the subsystems, e.g. a frequency, and consider it in the behavioral model. Determining the behavioral model comprising temporal varying loads of the subsystems may enable predicting 120 time-varying workload characteristics, for example.

For example, the method 100 may comprise reconfiguring the behavioral models with respect to a comparison between the predicted workload characteristic and an actual workload characteristic caused by the computational process distributed to the shared resource. Reconfiguring the behavioral models may be performed continuously while performing computational processes in the network system. By continuously reconfiguring the behavioral model, it may be possible to constantly achieve higher accuracy in predicting 120 workload characteristics. The reconfiguring may be achieved by using one of neural networks, support vector machines (SVM), and statistical analysis, for example. Using machine learning processes for reconfiguring the behavioral model may increase an accuracy of the behavioral model. For example, reconfiguring can be based on a machine learning process. Reconfiguring may enable considering new kinds of computational processes, e.g. not considered in an initially determined behavioral model.

Optionally, the method 100 may comprise determining a fingerprint of a computational process, the fingerprint comprising a requirement of resources for the computational process. Predicting 120 the workload characteristic of the shared resource may be based on the determined fingerprint of the computational process. The fingerprint of the computational process may be used in combination with the behavioral model for predicting 120 the workload characteristic. For example, the behavioral model may be determined based on at least a first computational process having a first fingerprint. A second computational process having a same or a similar fingerprint as the first computational process may cause a same or a similar workload characteristic as the first computational process. Determining a fingerprint of computational processes may enable predicting 120 workload characteristics for a plurality of similar computational processes while avoiding considering every computational process of the plurality for determining the behavioral model.

For example, the subsystems of the shared resource may be at least two of a processor, a network controller interface, an input/output channel, a memory, and a data storage. For example, two processors may be used, or two network controller interfaces may be used. In other words, the subsystems may be of a same kind. Alternatively, the subsystems of the shared resource may be at least two different of a processor, a network controller interface, an input/output channel, a memory, and a data storage. If two subsystems are taken into account, the first subsystem may be a processor and second subsystem may be a network controller interface. If more subsystems are taken into account, the third subsystem may be a memory and the fourth subsystem may be a input/output channel, for example. Taking more subsystems into account may enable increased control for distributing computational processes. Alternatively, only the most important subsystems, for example having the highest impact on the shared resource, may be taken into account, for example reducing the complexity of the method 100.

Figure 2:
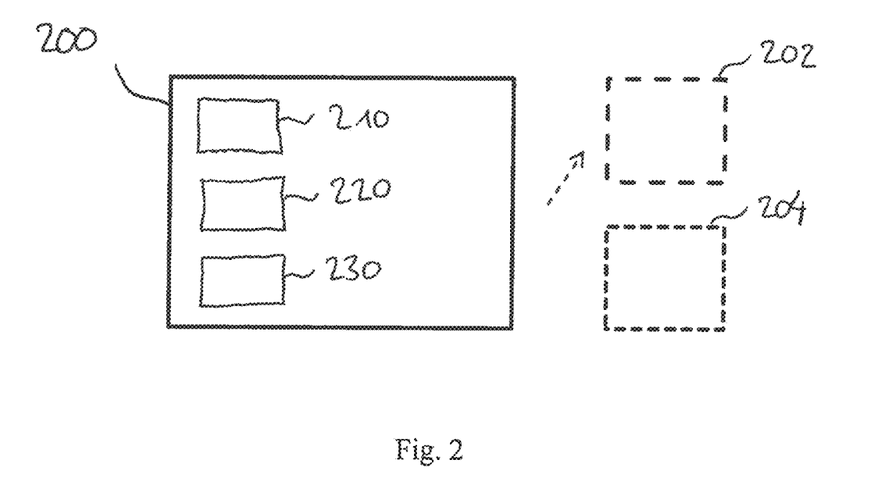
FIG. 2 shows an illustration of an example of a workload distribution device.

FIG. 2 shows an example of a workload distribution device 200. The workload distribution device 200 for distributing at least one computational process amongst shared resources comprises a determination device 210, configured to determine at least two shared resources capable of performing the computational process. The at least two shared resources may be a first shared resource 202 and a second shared resource 204, optionally connected to the workload distribution device 200, e.g. in a computing system. The workload distribution device 200 comprises a prediction device 220, configured to predict a workload characteristic for each of the shared resources, wherein the workload characteristic accounts for at least two subsystems of each shared resource. The workload distribution device 200 further comprises a selection device 230, configured to select one of the at least two shared resources based on the predicted workload characteristics. The workload distribution device 200 may be configured to perform the proposed method 100 according to examples described above or below.

The workload distribution device 200 may be provided in a system with shared resources and/or connected to at least two shared resources or to a plurality of shared resources. The workload distribution device 200 may receive a computational process to be distributed and forward it to the selected shared resource. Alternatively, the workload distribution device 200 may provide an information about the selected shared resource the computational process is to be distributed to. The information may be a distribution command or scheduling command.

For example, behavioral models for shared resources the workload distribution device 200 is connected to and/or for shared resources of a system with the workload distribution device 200 may be stored on the workload distribution device 200 for enabling predicting respective workload characteristics. For example, the workload distribution device may comprise a receiver configured to receive respective behavioral models.

Optionally, the workload distribution device may comprise a determination device, configured to determine a behavioral model for a shared resource by measuring a resulting load of the subsystems of a shared resource while performing at least one computational process on the shared resource. For example, the workload distribution may comprise a telemetry interface. The workload distribution device may be configured to measure a resulting load of shared resources and/or subsystems of the shared resources caused by performing at least one computational process.

Optionally, the workload distribution device may comprise a determination device, configured to determine a fingerprint of a computational process, the fingerprint comprising a requirement of resources for the computational process.

More details and aspects are mentioned in connection with the embodiments described above or below. The embodiments shown in FIG. 2 may comprise one or more optional additional features corresponding to one or more aspects mentioned in connection with the proposed concept or one or more embodiments described above or below (e.g. FIGS. 1 and 3-8).

An example relates to a system with shared resources. The system comprises a workload distribution device for distributing at least one computational process amongst shared resources, workload distribution device comprising: a determination device, configured to determine at least two shared resources capable of performing the computational process; a prediction device, configured to predict a workload characteristic for each of the shared resources, wherein the workload characteristic accounts for at least two subsystems of each shared resource; and a selection device, configured to select one of the at least two shared resources based on the predicted workload characteristics. The system may be a computing system and the workload distribution device may be a workload distribution device presented above or below.

For example, the system may further comprise a determination device, configured to determine a behavioral model for a shared resource by measuring a resulting load of the subsystems of a shared resource while performing at least one computational process on the shared resource. For example, the system may be configured to perform or use interference analysis.

More details and aspects are mentioned in connection with the embodiments described above or below. The system may comprise one or more optional additional features corresponding to one or more aspects mentioned in connection with the proposed concept or one or more embodiments described above or below (e.g. FIG. 1-8).

An aspect relates to an apparatus for distributing at least one computational process amongst shared resources. The apparatus comprises means for determining at least two shared resources capable of performing the computational process; means for predicting a workload characteristic for each of the shared resource, wherein the workload characteristic accounts for at least two subsystems of each shared resource; and means for selecting one of the at least two shared resources based on the predicted workload characteristics. The apparatus may be configured to perform the method 100.

For example, the apparatus further comprises means for making a selection of the shared resource resulting in a more uniform load distribution of the shared resource. The apparatus may be configured to be implemented or used in a computing system with shared resources.

More details and aspects are mentioned in connection with the embodiments described above or below. The apparatus may comprise one or more optional additional features corresponding to one or more aspects mentioned in connection with the proposed concept or one or more embodiments described above or below (e.g. FIG. 1-8).

An example relates to a computer program including program code, when executed, to cause a programmable processor to perform the method described above or below. An example relates to a non-transitory machine readable storage medium including program code, when executed, to cause a programmable processor to perform the method described above or below.

Figure 3A:
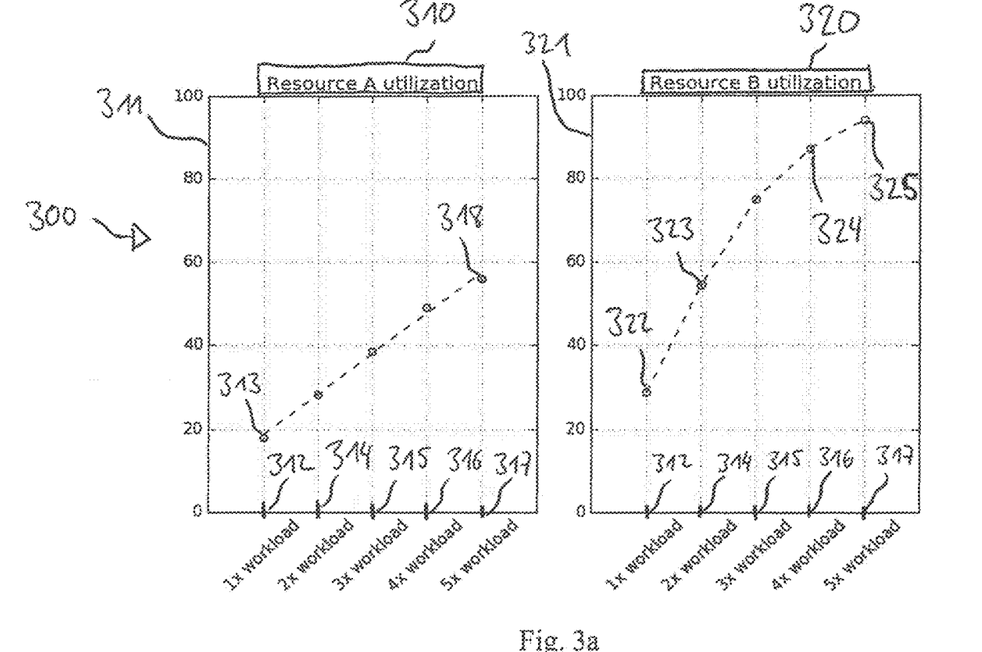
FIG. 3a, 3b show diagrams of examples of a workload depending utilization of system resources.
Figure 3B:
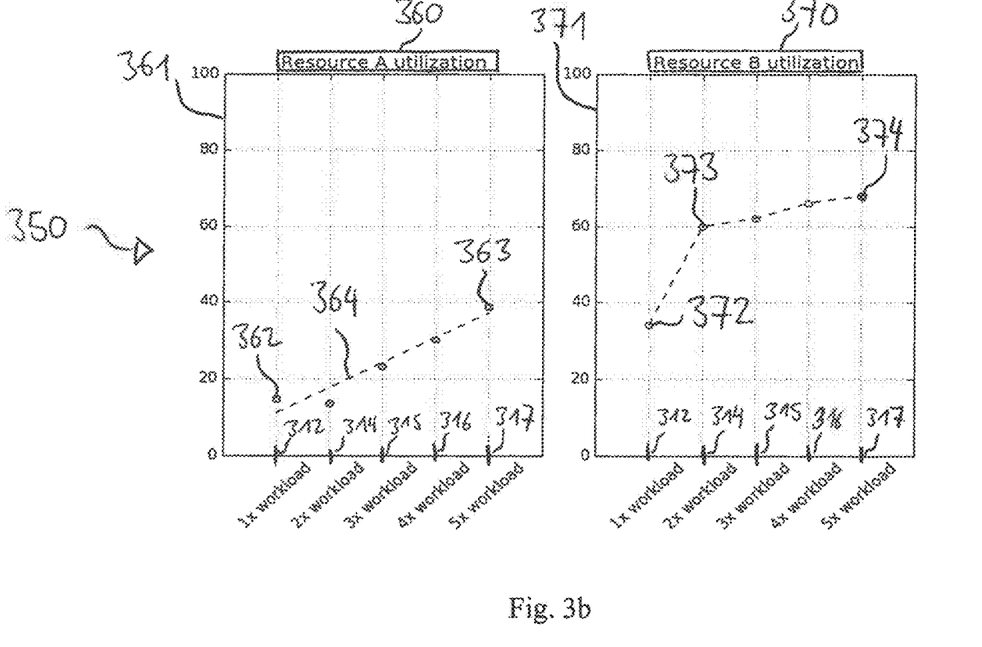

FIGS. 3*a* and 3*b* show examples of a workload depending utilization of system resources. The subsystems of a first resource 300 show a utilization differing from a system utilization of a second resource 350 when loading both resources with a same workload, for example. The workloads may be computational processes performed on the resources.

FIG. 3*a* shows a degree 311 of utilization of a first subsystem 310 of the first resource 300 and a degree 321 of utilization of a second subsystem 320 of the first resource 300 when workloads are applied to the first resource 300. For example, with a first workload 312, the first subsystem 310 is used to 19% at an operation point 313 and with a fifth workload 317, the first subsystem 310 is used to 58% at an operation point 318. For example, the degree 311 of utilization of the first subsystem 310 increases linearly from the first workload to the fifth workload passing a second workload 314, a third workload 315 and a fourth workload 316. The workloads 314, 315, 316 and 317 may be multiple workloads of the first workload 312. For example, the fifth workload 317 is five times the first workload 312.

Accordingly, FIG. 3*b* shows a degree 361 of a utilization of a first subsystem 360 of the second resource 350. The first subsystem 360 of the second resource may be of a same kind of subsystem as the first subsystem 310 of the first resource. Applying the first workload 312 the resource 350 may work at a first operation point 362 and applying the fifth workload 317, the resource 350 may work at a fifth operation point 363. At the first operation point 362, the first subsystem 360 of the second resource 350 may be used to 16% and at the fifth operation point, the first subsystem 360 may be used to 40%. The degree 361 of utilization of the first subsystem 360 may increase near-linearly from the first operation point to the fifth operation point. For example, operation points of the first subsystem may differ by less than 10% of an average gradient 364 between the first operation point 362 and the fifth operation point 363. Compared to the first subsystem of the first resource, the first subsystem of the second resource may be less loaded when applying the same workload to both resources. For example, an increase of workload may cause a smaller increase of degree of utilization of the first subsystem at the second resource then at the first resource. The first subsystem 310, 360 may be one of the at least two subsystems of a shared resource. The impact of a workload to the degree of utilization may be a fingerprint of the resources.

Further, the first resource 300 comprises a second subsystem 320. A degree 321 of utilization of the second subsystem 320 is shown for the workloads 312 to 317 in FIG. 3*a*. For example, with increasing workload, the degree 321 of utilization of the second subsystem increases non-linearly. For example, the difference between the degree of utilization at a first operation point 322 and a second operation point 323 of the second subsystem may be larger than the difference between the degree of utilization between a fourth operation point 324 and a fifth operation point 325 of the second subsystem.

The second resource 350 comprises a corresponding second subsystem 370. A degree 371 of utilization of the second subsystem 370 is shown for the workloads 312 to 317 in FIG. 3*b*. For example, the difference between the degree of utilization of the second subsystem 370 between a first operation point 372 and a second operation point 373 may be larger than the difference of the degree of utilization between the second operation point 373 and a fifth operation point 374.

According to an example, the resources 300, 350 may be described as systems and the subsystems 310, 320, 360, 370 may be described as resources of the systems. The example shows how resources of a system (e.g. the resources being a central processing unit (CPU), a network interface controller (NIC), a disk etc.) from a system A (e.g. the first system, e.g. a compute host or a resource aggregate from rack scale design, e.g. provided in a computing cluster) compares to another second system B (e.g. the second system). The difference in behaviors can be caused by different CPU revision, NIC configurations, Memory setups, etc. Knowing the fingerprints of the resources with a respective workload may enable predicting the behavior of the systems when applying workload to the systems depending on different operation points.

According to the example, the first system A may comprise a CPU working with 2.10 GHz, 64 GB RAM, and 1 GbE. The system behavior may show a linear increase of first resource (e.g. the CPU) utilization. The second resource (e.g. NIC) utilization increases polynomial when more workloads share the resources (as e.g. shown according to FIG. 3*a*). The second system B may comprise a CPU working at 2.66 GHz, 8 GB RAM, and 1 GbE. The system behavior may show a linear increase of the first resource (e.g. the CPU) utilization, although slower compared to the first resource of the first system. The second resource (e.g. NIC) utilization may increase in a polynomial manner—but slower, when more workloads share the resources (as e.g. shown according to FIG. 3*b*). Providing the behavior of at least two resources of a system may enable providing a detailed behavioral model of the respective system. The behavioral model comprising at least two resources may be used to accurately predict system behavior at different operation points when applying further processes or workloads on the system.

Figure 4:
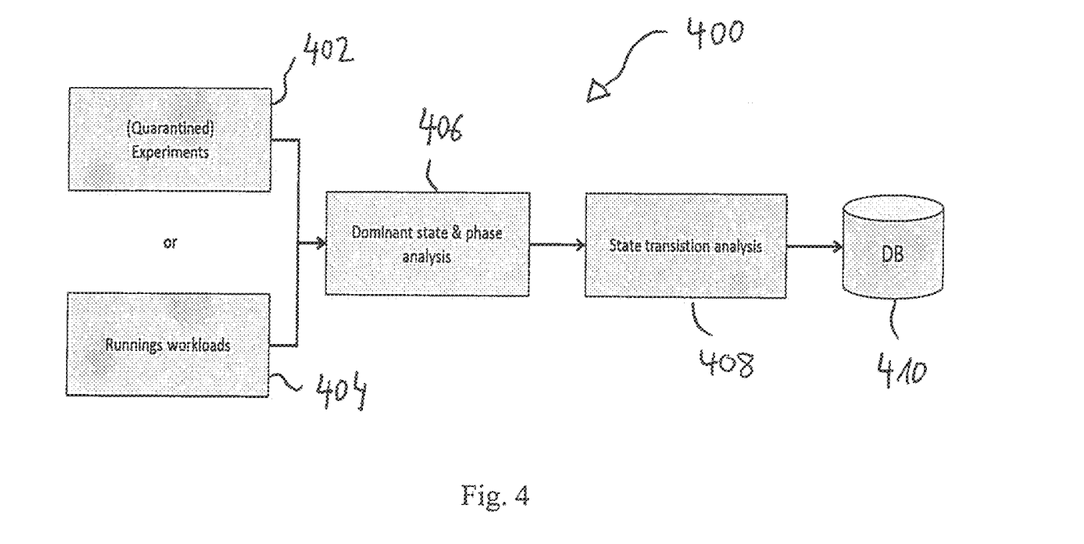
FIG. 4 shows an example of a method for generating a fingerprint model.

FIG. 4 shows a flow chart of an example of generating 400 a fingerprint model. Generating 400 a fingerprint model may be referred to as fingerprinting. Concepts of the disclosure can use analytics to support high precision orchestration and resource management (e.g. to distribute computational processes) through e.g. long running observations in a background flow, and a runtime driven foreground flow in which fine grained service request and rebalancing decisions may be used.

An example for creating fingerprints is described in the following. Data processing can be used to enable fingerprinting. In a background flow, based on telemetry and landscape data (detailing how the resources involved behave and how they are connected) from performing 402 either (possible isolated and hence quarantined) experimental runs, or determining 404 workloads currently running in a live system, an analysis phase may get triggered.

For example, in the analysis phase, dominant states for a time series dataset are determined 406. For each subsystem at play during the execution of a workload (e.g. the physical CPU, input/output (I/O) channel, NICs as well as virtual resources: the virtual CPU, I/O channel, NIC, etc.) time series data from a telemetry system can be gathered. This can be done for—but is not limited to—metrics/counters such as Utilization, Saturation, Throughput, etc. To determine the states, the overall time series dataset can be chunked in time windows and within each time window the most dominant state can be determined. By applying cluster analysis techniques those data points with the closest distance to each other can be grouped or clustered. The clusters with most points can be selected as the dominant state within the time window, while the cluster center can define the value of the dominant state. Machine learning algorithms (e.g. K-Means or MeanShift) can be used to achieve this.

Each subsystems (or resource's) dominant state can be analyzed 408 to determine in which state it will reside mostly in, and how or when it will transition to a different state. The results of this analysis will capture how a resource changes states under stress (e.g. with applied workload). By analyzing the dominant states, the probabilities of the subsystem (or resource) to perform a state transition (into the same or another state) can be determined. This can be achieved e.g. by applying a technique like a Hidden Markov Model analysis. Furthermore, the frequency in which state changes occur can be analyzed. Therefore the dominant state's amplitude can be brought into relation to the full frequency range. The signal may hence be transformed from a time domain into a frequency domain. Algorithms like the Fast Fourier Transformation (FFT) can be used for this. The results may capture the probability of state transitions, or how frequent a state transition happens, e.g. in average.

The results of the fingerprint analysis may be (e.g. continuously) stored 410 in a database (DB) e.g. as part of a background flow.

Figure 5:
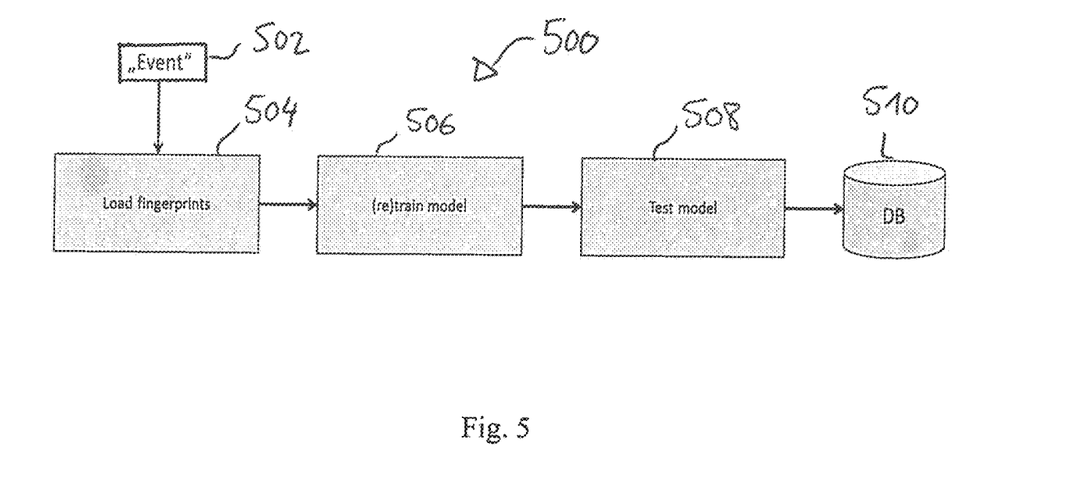
FIG. 5 shows an example of a method for reconfiguring a fingerprint model.

FIG. 5 shows an example of reconfiguring 500 a fingerprint model. Reconfiguring 500 may comprise improving a behavioral model or a fingerprint. An entity's behavior may be modelled more accurately and/or determined continuously.

For example, models may be trained in the background flow, based on fingerprints which determine when and how often a shared resource will be in a certain state, in other words capturing the resource's characteristic behavior when stressed or loaded. According to proposed examples, fingerprints may be used to train machine learned models which capture the specific behaviors of shared resources under stress.

When receiving 502 a trigger signal, e.g. whenever (manually) triggered, e.g. on an orchestration event (e.g. initial placement of a workload/computational process, rebalancing of the landscape like a context change—e.g. addition of a resource aggregate—, pause/kill/migration of a workload or a capacity planning activity happens) the reconfiguring 500 may be started. Reconfiguring may be applied for all resources (or subsystems) of the system. For all known experiments, or workload running on the associated resource (For example a CPU, NIC, disk, etc.), previously determined fingerprints may be loaded 504.

The loaded (behavioral) model or fingerprint may be (re)trained 506, e.g. a model that is able to predict the state and frequency/probability of state changes of a resource which is being stressed by putting another workload on it. During the training/learning process the statistical estimators performing this task may capture the unique characteristic behavior of the resource. The training vectors of such a model may consist of a set of fingerprints of workloads when run in isolation on the resource, and the fingerprints of the resource (could be running another workload). The target vector may include the expected outcome—based on past observations. Algorithms and/or neural networks such as Support Vector Machines (SVM) or Ridge Regression can be used, e.g. in an isolated process and/or as part of the workflow (e.g. performed by the method), with the following training and target vectors. A first training vector: fingerprint of a workload A run in isolation in combination with fingerprint of a workload B run in isolation; Target vector: fingerprint of workload A+B. Second training vectors: fingerprint of the workload A run in isolation in combination with fingerprint of the workload A+B; Target vector: fingerprint of workload 2×A+B sharing the resource (e.g. CPU). Reconfiguring the model may comprise using separately determined fingerprints combined to increase an accuracy of the model.

For example, the (re)trained model may be tested 508 using further runs of workloads (not considered for generating or training the fingerprints) and determine the accuracy. When the accuracy is satisfying, the model may be stored 510 in the database.

Figure 6:
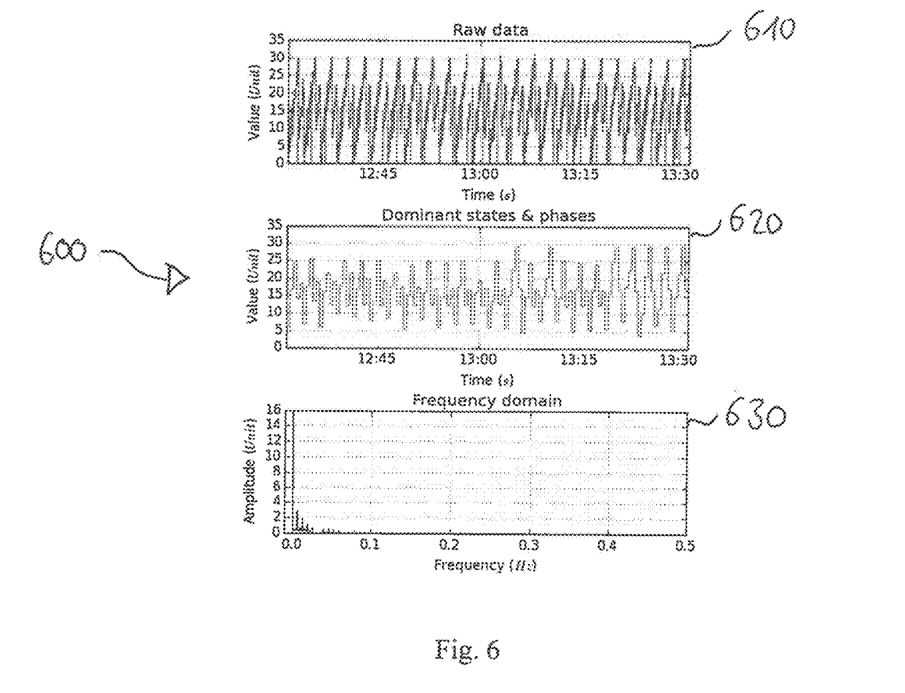
FIG. 6 shows an exemplary illustration of a fingerprint of a computational process.

FIG. 6 shows an example of a fingerprint 600 illustrated in different domains. For example, spectral analysis may be used to transform raw data 610 of the fingerprint into a dominant state representation 620 and into a spectrum representation 630. Spectral analysis may result in a database populated with models per resource: For example—but not limited to—one model for CPU, one model for NIC, one model for I/O, etc. The models may capture the characteristic behavior of the resources as they become more and more heavily loaded over time. The fingerprint shown in FIG. 6 in different representations may describe a CPU's utilization when 3 workloads are being deployed on a system (or resource) with the CPU. The fingerprint is shown in form of a raw counter's time series, the dominant states, and a spectrum detailing the transitions. For example, the spectrum representation 630 may be used to facilitate predicting future transitions or a probability of transitions between states of the resource.

Figure 7:
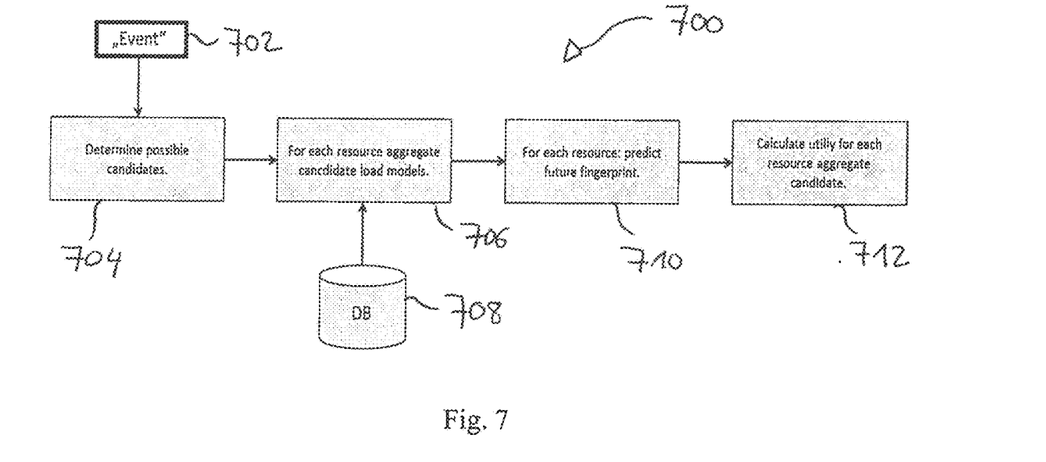
FIG. 7 shows an example of predicting workload characteristics.

FIG. 7 shows an example of predicting 700 workload characteristics. Predicting workload characteristics may enable to distribute workloads on a system such that resources of the system are used more equally and/or a utilization level of resources of the system is more uniform. When receiving 702 an orchestration event, predicting 700 may be performed in a foreground flow during provisioning of a workload. Out of all possible (or shortlisted) resource aggregates/compute hosts in a cluster/system those are picked or determined 704, which satisfy the resource request requirements.

For each candidate (or determined shared resource), the involved resources (respectively subsystems) may be identified and the models as stored in the database (see e.g. the examples according to FIG. 4 and FIG. 5) can be loaded 706. The models may be provided 708 by the database. Fingerprints of the workload that is to be handled, and the fingerprint describing the current behavior of the resource may be used, and a future fingerprint may be predicted 710.

The prediction can be used to calculate 712 a utility of a resource. This utility calculation can be based on the dominant state (e.g. its expected level of utilization/saturation/throughput/latency etc.) that the resource will reside in once workload(s) to be handled are place on it, as well as the probability/frequency to stay in the state using a simple step function describing the utility of resource:

$$\text{utility of resource} = \begin{cases} \text{dominant state} & \text{if probability of state transition} = 0 \\ \text{dominant state} + C, & \text{if probability of state transition} > 1 \\ 0.0 & \text{otherwise} \end{cases}$$

The factor C can be used to positively or negatively reward the fact that the resource is for example not in a single high utilization state. Factor C can be a fixed value, or a term based on the probability or the frequency of a state transition.

The Utility of a resource can then be used to pick (or select 130) the best candidate (or shared resource, respectively). Furthermore other utilities about the resources behavior (e.g. for preventing interference) can be included.

These individual utility scores can be comparable between the sub-systems/resources of a resource aggregate (e.g. a compute hosts) and therefore may allow for fast reasoning. Scoring for advanced control e.g. for distributing computational processes may increase an efficiency of distribution.

Given e.g. a business objective that e.g. determines utilization needs to be maximized and/or evenly spread, a utility function can be defined that ensures tight filling of the resource aggregate/compute host. This utility of aggregate function can be defined as:

utility of aggregate=mean(scores)*((var(scores)−min (var(scores)))

where scores may be a list of scores for the individual resource of the aggregate as defined above. For example, the variance of the mean be 0 and may be treated as a very small number (e.g. smaller than 0.001). As one example, to ensure a uniform filling of resources/subsystems of a resource aggregate/compute hosts the candidate with the lowest variance between the predicted scores of its resources can be picked. This may ensure decisions can be made across the compute, storage and network domain based on insights about resources unique behavioral patterns.

Figure 8:
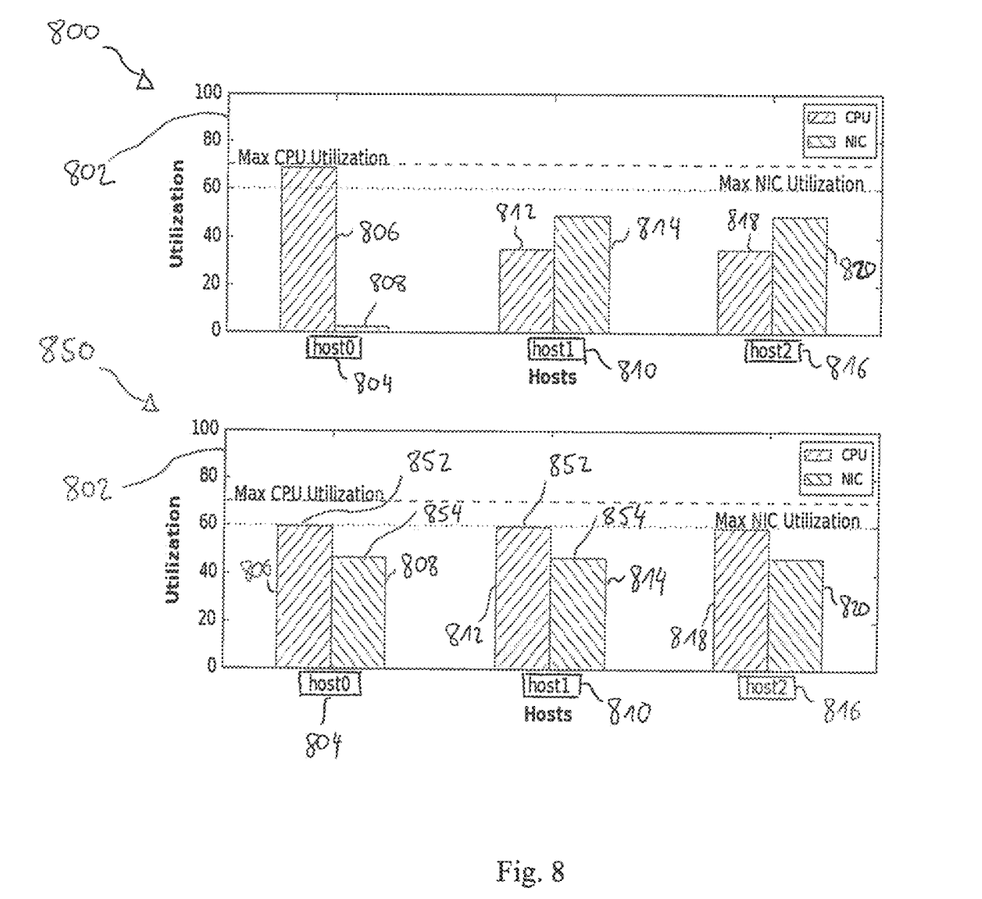
FIG. 8 shows diagrams comprising an example of resulting workload characteristics using the proposed distribution concept compared to resulting workload characteristics using other concepts.

FIG. 8 shows an example of resulting workload distribution using the proposed distribution concept compared to resulting workload distribution using other concepts. A first example 800 shows a utilization 802 of subsystems of different resources, distributing computational processes amongst the resources using other concepts. For example, a first resource 804 has a first subsystem 806 and a second subsystem 808, a second resource 810 has a first subsystem 812 and a second subsystem 814, and a third resource 816 has a first subsystem 818 and a second subsystem 820. The first subsystem may be a CPU and the second subsystem may be a NIC of the respective resources. In the first example 800, the degree of utilization of the first subsystem 806 of the first resource 804 may differ by more than 20 times from the degree of utilization of the second subsystem 808 of the first resource 804. In other words, the utilization may be very uneven or non-uniform. By contrast, the degree of utilization of the first and second subsystem of the second resource 810 and the third resource 816 may be less than 50% of full utilization of the subsystems. In other words, the resources 810, 816 and there corresponding subsystems might not be used efficiently. Non-uniform and nonefficient utilization may increase costs of a system comprising the resources.

The proposed concepts can be used for achieving for example tighter packaging of the resources, as shown in a second example 850 using the same resources of the first example, wherein the computational processes are distributed according to proposed concepts. For example, in the second example 850 the same computational processes may be distributed amongst the resources 804, 810, 816 as in the first example 800. By using the proposed concepts for distributing the computational processes, the difference between the degree of utilization of the first subsystem 806 and the second subsystem 808 of the first resource 804 can be significantly reduced compared to the first example 800. For example, in the second example 850, the degree of utilization of the first subsystem 806 may be less than 20% higher than the degree of utilization of the second subsystem 808. In other words, the subsystems of the resource may be equally or uniformly loaded. In the second example 850, the first subsystems 806, 812 of the resources may have the same degree of utilization 852 and the second subsystems 808, 814, 820 may have the same degree of utilization 854. In other words, the resources 804, 810, 816 may be uniformly loaded by distributing the computational processes according to proposed concepts. The degrees of utilization 852, 854 may be above 70% (or above 80%, or above 90%) of the full utilization of the respective subsystems. In other words, the subsystems of the resources may be used more efficiently by distributing computational processes according to proposed concepts compared to other concepts. Efficient utilization may decrease costs (for example acquisition costs and/or operating costs) of a system comprising the resources.

A resource may be an aggregate of subsystems, e.g. a host in a compute cluster. For achieving tighter packaging, leveraging the knowledge of how subsystems of the aggregate will behave when heterogenous workloads are deployed. Other concepts may result in unequal utilization and hence higher TCO. For example in the first example 800, the first resource 804 can get loaded with compute intense workloads resulting in full utilization of the first subsystem 806 and does not evenly load the second subsystem 808, e.g. a NIC.

Other approaches for the deployment of workloads may be based on the use of templates e.g. OpenStack Heat templates. Some of these templates may contain generic descriptions of resources which the orchestration service attempts to fulfil at deployment by selecting the nodes with the largest amounts of resources available. After deployment telemetry may be used to monitor the performance of the deployed workload. If performance issues are identified then the workload may be simply migrated to another resource. Alternatively, the workload may be deployed in isolation on the infrastructure, e.g. no other workloads concurrently deployed in order to provide predictability over performance behavior. This approach may be used in virtual network function (VNF) deployments.

Other approaches may be based on the use of deployment templates which do not consider infrastructure behavior dynamics including the effects of previously deployed workloads. Other approaches may be inefficient in their approach to the allocation of resources, due to the inability of the system to consider the behavioral dynamics of the resources and the reciprocal influences workloads have upon each other. As a result there may be a high probability that the workload will not perform as required. Other approaches may lack the ability to adapt dynamically to changing operational conditions due to the lack of intelligent automation, a capability that would facilitate dynamic learning. Other workload characterization techniques might not capture the dynamic behavior of shared resources which are put under stress to achieve higher levels of Utilization and hence TCO, as they may focus only on single workload instances.

The usage of telemetry data, application fingerprinting and resource management are proposed in combination. The proposed method may comprise usage of frequency analysis on the frequency of state changes. The proposed concepts may specifically target how individual sub-systems/resources in a resource aggregate are behaving when they're shared among various workloads. The proposed combination of concepts can be used in a way, so that the system can continuously self-improve. For example, the fingerprinting and training of the models that capture individual subsystem behavior when shared can run in a background flow, while corresponding insights can be reasoned in a foreground flow using utility functions. The usage of a utility function that may allow to reason over multi sub-system making up a resource aggregate (e.g. a compute hosts) in a uniform/abstracted manner is proposed. Furthermore, this may allow for reasoning over multiple sub-systems (with their individual characteristics/features) on how the overall system is going to behave. By using a utility function which balances between the resources/sub-systems of a resource aggregate/compute host during packaging workloads it may be ensured that less interference effects will show—e.g. a set of compute intense are spread in the cluster, while not overloading a single resource.

Examples relate to methods to capture workload and resource behavior for advanced control. Based on telemetry enriched logical and physical landscapes it may be possible to create a fingerprint which captures the behavior of workload/service components and or resource they use. Based on the fingerprints it may be possible to train models using machine learning algorithms which capture the behavior of service components and resources as they are being stressed. By predicting the impact of a workload placement on a shared resource it may be possible to leverage the different behavioral patterns and find the optimal placement using model driven control mechanisms to guarantee service delivery.

The proposed concepts may ensure that service providers can capture, learn and leverage insights from resources (that e.g. behave differently under stress) for orchestration and resource management decisions. The proposed concepts may enable that these different resource behaviors can be leveraged for systems when making orchestration decision like: initial placement of workloads, re-balancing/migration of workloads and capacity planning.

Further aspects are provided by the following examples.

Example 1 comprises a method for distributing at least one computational process amongst shared resources, the method comprising: determining at least two shared resources capable of performing the computational process; predicting a workload characteristic for each of the shared resources, wherein the workload characteristic accounts for at least two subsystems of each shared resource; and selecting one of the at least two shared resources based on the predicted workload characteristics.

Example 2 comprises the method according to example 1, wherein the selection of the shared resource results in a more uniform load distribution of the shared resource.

Example 3 comprises the method according to example 1 or 2, wherein the selection of the shared resource results in a more uniform load distribution amongst the shared resources.

Example 4 comprises the method according to one of the preceding examples 1 to 3, wherein the selection of the shared resource results in higher probability of a more uniform load distribution.

Example 5 comprises the method according to one of the preceding examples 1 to 4, wherein the workload characteristic comprises a respective degree of utilization of the at least two subsystems as a result of the computational process performed on the shared resource.

Example 6 comprises the method according to one of the preceding examples 1 to 5, wherein the workload characteristic further depends on at least one other computational process running on the respective shared resource.

Example 7 comprises the method according to one of the preceding examples 1 to 6, wherein the subsystems are at least two different of a processor, a network controller interface, an input/output channel, a memory, and a data storage.

Example 8 comprises the method according to one of the preceding examples 1 to 7, wherein predicting a workload characteristic comprises evaluating an expected load of the subsystems over a predetermined duration.

Example 9 comprises the method according to one of the preceding examples 1 to 8, wherein predicting the work-load characteristic comprises determining a frequency of a variation of a load of the subsystems while performing the computational process.

Example 10 comprises the method according to one of the preceding examples 1 to 9, further comprising: determining a behavioral model for a shared resource by measuring a resulting load of the subsystems of a shared resource while performing at least one computational process on the shared resource.

Example 11 comprises the method according to example 10, wherein determining the behavioral model comprises determining a temporal variation of the resulting load of the subsystems.

Example 12 comprises the method according to example 10 or 11, wherein telemetry is used for measuring the resulting load of the subsystems.

Example 13 comprises the method according to one of examples 10 to 12, further comprising: providing the behavioral model for predicting the workload characteristic for the respective shared resource.

Example 14 comprises the method according to one of the preceding examples, further comprising: determining a fingerprint of a computational process, the fingerprint comprising a requirement of resources for the computational process.

Example 15 comprises the method according to example 14, wherein the fingerprint of the computational process is used in combination with the behavioral model for predicting the workload characteristic.

Example 16 comprises the method according to example 14, wherein a fingerprint similar to the fingerprint of the computational process is used in combination with the behavioral model for predicting the workload characteristic.

Example 17 comprises a workload distribution device for distributing at least one computational process amongst shared resources, the workload distribution device comprising: a determination device, configured to determine at least two shared resources capable of performing the computational process; a prediction device, configured to predict a workload characteristic for each of the shared resources, wherein the workload characteristic accounts for at least two subsystems of each shared resource; and a selection device, configured to select one of the at least two shared resources based on the predicted workload characteristics.

Example 18 comprises the workload distribution device according to example 17, wherein the workload characteristic comprises a respective degree of utilization of the at least two subsystems as a result of the computational process performed on the shared resource.

Example 19 comprises the workload distribution device according to example 17 or 18, wherein the workload characteristic further depends on at least one other computational process running on the respective shared resource.

Example 20 comprises the workload distribution device according to one of examples 17 to 19, wherein the subsystems are at least two different of a processor, a network controller interface, an in-put/output channel, a memory, and a data storage.

Example 21 comprises the workload distribution device according to one of examples 17 to 20, wherein the prediction device is configured to predict the workload characteristic based on evaluating an expected load of the subsystems over a predetermined duration.

Example 22 comprises the workload distribution device according to one of examples 17 to 21, wherein the prediction device is configured to determine a frequency of a variation of a load of the subsystems while performing the computational process.

Example 23 comprises the workload distribution device according to one of examples 17 to 22, further comprising: a determination device, configured to determining a behavioral model for a shared resource by measuring a resulting load of the subsystems of a shared resource while performing at least one computational process on the shared resource.

Example 24 comprises the workload distribution device according to example 23, wherein the determined behavioral model comprises a determined temporal variation of the resulting load of the subsystems.

Example 25 comprises the workload distribution device according to example 23 or 24, comprising a telemetry interface.

Example 26 comprises the workload distribution device according to one of examples 17 to 25, further comprising: a determination device, configured to determine a fingerprint of a computational process, the fingerprint comprising a requirement of resources for the computational process.

Example 27 comprises a system with shared resources, the system comprising a workload distribution device for distributing at least one computational process amongst shared resources, comprising: a determination device, configured to determine at least two shared resources capable of performing the computational process; a prediction device, configured to predict a workload characteristic for each of the shared resources, wherein the workload characteristic accounts for at least two subsystems of each shared resource; and a selection device, configured to select one of the at least two shared resources based on the predicted workload characteristics.

Example 28 comprises the system according to example 27, further comprising a determination device, con-figured to determining a behavioral model for a shared resource by measuring a resulting load of the subsystems of a shared resource while performing at least one computational process on the shared resource.

Example 29 comprises an apparatus for distributing at least one computational process amongst shared re-sources, comprising: means for determining at least two shared resources capable of performing the computation-al process; means for predicting a workload characteristic for each of the shared resources, wherein the workload characteristic accounts for at least two subsystems of each shared resource; and means for selecting one of the at least two shared resources based on the predicted work-load characteristics.

Example 30 comprises the apparatus according to example 29, comprising means for making a selection of the shared resource resulting in a more uniform load distribution of the shared resource.

Example 31 comprises a computer program including program code, when executed, to cause a programmable processor to perform the method of examples 1 to 16.

Example 32 comprises a non-transitory machine readable storage medium including program code, when executed, to cause a programmable processor to perform the method of examples 1 to 16.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for distributing at least one computational process among shared resources, the method comprising:
determining load data of at least two shared resources associated with execution of at least one computational process, wherein the at least two shared resources comprise two or more of: a processor, a network controller interface, an input/output channel, a memory, and a data storage;
based at least on the load data, predicting at least one workload characteristic for the at least two shared resources from performance of a workload using the at least two shared resources based on machine learning (ML) and utilizing clustering of data points, wherein the at least one workload characteristic comprises a level of utilization of the at least two shared resources;
selecting at least one of the at least two shared resources for execution of the workload based on the predicted at least one workload characteristic; and
causing execution of the workload on the selected at least one of the at least two shared resources.

2. The method according to claim 1, wherein the selection of the at least one of the at least two shared resources comprises provide a more uniform load distribution of the shared resource.

3. The method according to claim 1, wherein the selection of the at least one of the at least two shared resources comprises provide a more uniform load distribution amongst the shared resources.

4. The method according to claim 1, wherein the selection of the at least one of the at least two shared resources comprises provide a higher probability of a more uniform load distribution.

5. The method according to claim 1, wherein the at least one workload characteristic comprises a respective degree of utilization of the at least two shared resources as a result of the workload.

6. The method according to claim 1, wherein the at least one workload characteristic further depends on at least one other computational process running on the respective shared resource.

7. The method according to claim 1, wherein the at least two shared resources are at least two different devices of: a processor, a network controller interface, an input/output channel, a memory, and a data storage.

8. The method according to claim 1, wherein predicting at least one workload characteristic for the at least two shared resources comprises evaluating an expected load of the at least two shared resources over a predetermined duration.

9. The method according to claim 1, wherein predicting at least one workload characteristic for the at least two shared resources comprises determining a frequency of a variation of a load of the at least two shared resources while performing the workload.

10. The method according to claim 1, further comprising:
determining a behavioral model for at least one shared resource by measuring a resulting load of subsystems of at least shared resource while performing the workload.

11. The method according to claim 10, wherein determining the behavioral model comprises determining a temporal variation of the resulting load of the subsystems.

12. The method according to claim 10, comprising measuring the resulting load of the subsystems based on telemetry.

13. The method according to one of claim 10, further comprising:
providing the behavioral model for predicting the at least one workload characteristic for the at least two shared resources.

14. A workload distribution device for distributing at least one computational process among shared resources, the workload distribution device comprising:
- circuitry configured to determine load data of at least two shared resources associated with execution of at least one computational process, wherein the at least two shared resources comprise two or more of: a processor, a network controller interface, an input/output channel, a memory, and a data storage;
- circuitry configured to predict at least one workload characteristic for at least two shared resources from performance of a workload based at least on the load data and based on machine learning (ML) and utilizing clustering of data points, wherein the at least one workload characteristic comprises a level of utilization of the at least two shared resources;
- circuitry configured to select at least one of the at least two shared resources for execution of the workload based on the predicted at least one workload characteristic; and
- circuitry to cause execution of the workload on the selected at least one of the at least two shared resources.

15. The workload distribution device according to claim 14, wherein the at least one workload characteristic comprises a respective degree of utilization of the at least two shared resources as a result of the workload.

16. The workload distribution device according to claim 14, wherein the circuitry to predict is configured to predict the at least one workload characteristic based on evaluation of an expected load of the at least two shared resources over a predetermined duration.

17. The workload distribution device according to claim 14, wherein the circuitry configured to predict at least one workload characteristic is configured to determine a frequency of a variation of a load of the at least two shared resources while performing the workload.

18. The workload distribution device according to claim 14, further comprising:
- circuitry configured to determine a behavioral model for at least one shared resource by measurement of a resulting load of subsystems of at least one shared resource from performance of the workload.

19. The workload distribution device according to claim 18, wherein the determined behavioral model comprises a determined temporal variation of the resulting load of the subsystems.

20. One or more non-transitory machine-readable storage media comprising a plurality of instructions stored thereon that, in response to being executed, cause a compute device to:
- determine load data of at least two shared resources associated with execution of at least one computational process;
- predict at least one workload characteristic for at least two shared resources from performance of a workload based at least on the load data and based on machine learning (ML) and utilizing clustering of data points, wherein the at least one workload characteristic comprises a level of utilization of the at least two shared resources;
- select at least one of the at least two shared resources for execution of the workload based on the predicted at least one workload characteristic; and
- cause execution of the workload on the selected at least one of the at least two shared resources.

21. The one or more non-transitory machine-readable storage media of claim 20, wherein the shared resource comprises one or more of: central processing unit (CPU), network interface controller (NIC), an input/output channel, a memory, a data storage, or disk.

* * * * *